(12) United States Patent
Nakano et al.

(10) Patent No.: US 6,482,279 B2
(45) Date of Patent: Nov. 19, 2002

(54) TRANSCRIBING METHOD

(75) Inventors: Jun Nakano, Tokyo (JP); Shuichi Kikuchi, Miyagi (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 09/811,896

(22) Filed: Mar. 19, 2001

(65) Prior Publication Data

US 2002/0000283 A1 Jan. 3, 2002

(30) Foreign Application Priority Data

Mar. 17, 2000  (JP) ........................................ 2000-081853

(51) Int. Cl.[7] ............................................... B32B 31/16

(52) U.S. Cl. ...................................... 156/73.1; 156/219

(58) Field of Search ................................ 156/73.1, 209, 156/219, 289, 290, 308.2, 308.4, 580.1, 580.2

(56) References Cited

U.S. PATENT DOCUMENTS

| | | | | |
|---|---|---|---|---|
| 4,836,890 A | * | 6/1989 | Murata et al. | ............. 156/73.1 |
| 4,871,404 A | * | 10/1989 | Murata et al. | ............. 156/73.1 |
| 5,536,456 A | * | 7/1996 | Kuwahara et al. | ......... 264/1.33 |

* cited by examiner

Primary Examiner—James Sells
(74) Attorney, Agent, or Firm—Sonnenschein, Nath & Rosenthal

(57) ABSTRACT

In the manufacturing process of recording media by transcribing information signals formed on a stamper onto the substrate, high-quality transcriptions must be achieved without causing any thermal deformations or warps. To this end, when the convexconcaves formed on a main surface of the stamper representing information signals are transcribed onto the substrate, a main surface of said substrate and a main surface of said stamper where the convexconcaves are formed are brought into contact facing each other, and said substrate and said stamper are pressurized with a prescribed pressure as they remain in contact, and in addition the temperature of only the contact surface layer of said substrate with said stamper is raised.

5 Claims, 3 Drawing Sheets

TRANSCRIBING METHOD

RELATED APPLICATION DATA

The present application claims priority to Japanese Application No. P2000-081853 filed Mar. 17, 2000, which application is incorporated herein by reference to the extent permitted by law.

BACKGROUND OF THE INVENTION

This invention relates to a manufacturing method of information recording media for recording various information signals such as audio signals or video image signals.

As media for recording audio, video and other various types of information, for example, optical disk recording media and magnetic disk recording media are known. As these recording media, so-called CD (Compact Disk) or DVD (Digital Versatile Disk) containing emboss pits as signal information, phase change type optical disk in which inorganic films or organic films are laminated on a groove concentrically formed and information signals are written on such films with laser beams focused from the outside, magneto-optical disk utilizing the magneto-optical effect of recording films, and in addition magnetic disks in which signals are written magnetically can be mentioned.

As a method of forming the recording layer of information signals consisting of phase pits, pregrooves and other micro convexconcaves in which data information, tracking servo signals, etc. of these recording media are recorded, for example the injection molding of plastic substrates is generally in practice. In other words, when disk-type information recording media are formed by means of an injection molding machine, a die and a stamper, information signals are transcribed from the stamper to form such information recording media.

In the meanwhile, the substrate of disk-type information recording media are generally formed by injection molding of plastics except in case of magnetic recording media of glass and aluminum. The most disadvantageous point of this substrate is that at the stage where dissolved plastic is injected into a metal cavity, the friction of the plastic being injected with the die, the pressure or temperature developing at the time of injection result in a distorted molecular orientation or a thermal distortion of plastic. The internal stress having developed within the substrate is somewhat mitigated and becomes small by the mitigation of stress in the process of cooling and solidification within the die. However, most of the internal stress having developed within the substrate is not mitigated before the solidification of plastic and remains as a residual stress within the substrate. In particular, the molecular orientation distortion resulting from the injection of plastic is hardly mitigated during the anneal and other heat processing, causing double refractions of light, warp, swell and other forms of skew.

In recent years, in order to enhance the recording density of optical disks, such means that the numerical aperture (hereinafter referred to as "NA") of objectives is enlarged, or that the wavelength of laser beams is reduced to that of shortwave have been reported and put into practice. And as a result of improvements in recording density brought by those means, the depth of focus of objectives has become smaller and the tolerance for warps and swells of the substrate has become severer, and at the same time the thickness of the substrate constituting a light transmission layer has become thinner.

However, with regard to injection molding, in addition to said orientation distortion, there is a temperature gradient of 100° C. or more between the dissolution temperature of plastic and the die temperature, and the orientation distortion grows larger as the substrate is thinner from the moment when plastic is injected into the die while the solidification process progresses, and it is extremely difficult to manufacture substrates satisfactory in all respects including capacity to transcribe, double refraction of light, warp, etc.

Also, in the field of magnetic recording media, with the rise of recrding density and the fall of prices, substrates are being developed successively, and new recording media in combination with optical disks are being developed.

In other words, according to the prior injection molding method, it is extremely difficult to produce substrates with little thermal deformation, warp or swell by transcribing minute information signals with a high precision.

Furthermore, in addition to the injection molding method, there is a method of transcribing the information signals of the stamper by heating the whole sheet or other types of substrate to its glass transition temperature or deformation temperature and by applying pressure thereon. This method can produce warps during the cooling process of the plastic material, and depending on the type of the plastic material used complex apparatuses are required resulting in a cost disadvantage.

The present invention therefore was devised in view of the past issues raised above, and it is an object of the present invention to provide a transcribing method enabling high quality transcription free of thermal deformation and warps in the manufacturing process of recording media for transcribing information signals formed on a stamper onto the substrate.

SUMMARY OF THE INVENTION

For transcribing information signals formed as micro convexconcaves on a main surface of the stamper onto the substrate, the transcribing method related to the present invention brings a main surface of the substrate and a main surface of the stamper having micro convexconcaves formed thereon into contact facing each other, pressurizes the substrate and the stamper to a prescribed pressure as they remain in contact facing each other, and raises the temperature of only the contact surface layer of the substrate which is brought into contact with the stamper to the glass transition temperature or above.

The transcribing method related to the present invention brings a main surface of the substrate and a main surface of the stamper having micro convexconcaves formed into contact to face each other, pressurizes the substrate and the stamper to a prescribed pressure as they remain in contact facing each other, and raises only the temperature of the contact surface layer of the substrate with the stamper to the glass transition temperature or above. The surface layer of the substrate which is brought into contact with the stamper begins to soften at a time when their temperature reaches the glass transition temperature of the substrate or above. And, as the substrate remains under pressure at this time, information signals formed on the stamper in the form of micro convexconcaves are transcribed on the contact surface with the stamper. In addition, the temperature of only the contact surface layer of the substrate with the stamper is high. In other words, the temperature of the whole substrate has not risen, but only a part of the substrate has a high temperature, and therefore transcription is carried out without any thermal deformation or any generation of internal stress and therefore, any deformation caused by the internal stress.

The transcribing method related to the present invention brings a main surface of the substrate and a main surface of the stamper having micro convexconcaves representing information signals formed into contact facing each other, pressurizes the substrate and the stamper to a prescribed pressure as they remain in contact, and raises the temperature of only the contact surface layer of the substrate to the glass transition temperature of the substrate or over.

In other words, as it is not necessary, according to the transcribing method related with the present invention, to heat the substrate and/or the stamper to a high temperature, neither warps, deformations, nor internal stresses of the substrate develop due to heat after the transcription of information signals and no deformations of the substrate resulting therefrom develop. And therefore, it becomes possible to transcribe with a high precision and to produce high-quality substrates. In addition, the transcribing method related with the present invention raises the temperature of only the contact surface layer of the substrate with the stamper and saves time for a cooling process of the substrate after each transcription, it is thus possible to improve production efficiency in the manufacturing process.

Therefore, according to the present invention, it is possible to provide a transcribing method of easily producing high-quality substrates free from warps or deformations.

DESCRIPTION OF THE PREFERRED EMBODIMENTS

Referring to drawings, preferred embodiments of the present invention will be explained in detail. The present invention, however, is not limited to the embodiments described below, and may be modified as the occasion may require to the extent not inconsistent with the purport of the present invention.

Figure 1:
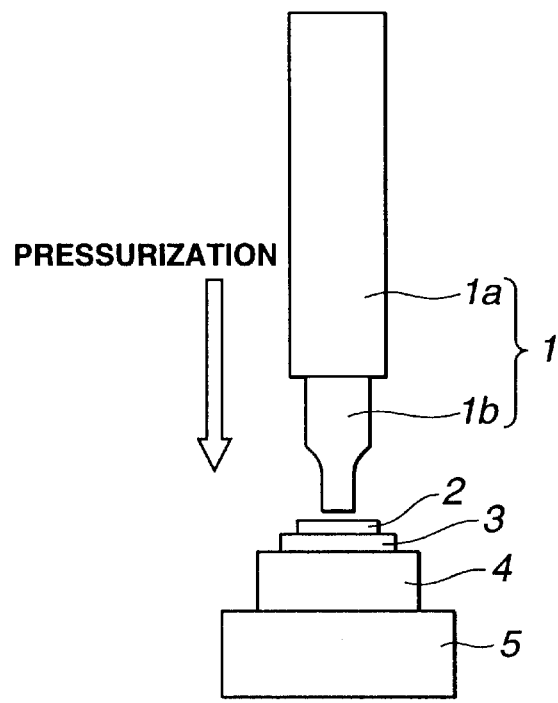
FIG. 1 is a schematic perspective view showing an example of configuration of an information signal transcribing apparatus.

FIG. 1 is a schematic representation of the structure of an information signal transcribing apparatus made by applying the present invention.

The information signal transcribing apparatus made by applying the present invention consists of an ultrasonic wave generating apparatus 1, a substrate 2 to which information signals are transcribed, a stamper 3 on which information signals to be transcribed on the substrate 2 are formed as micro convexconcaves, a die 4 on which the stamper 3 is loaded and fixed, and a stage 5 to which the die 4 is fixed.

The ultrasonic wave generating apparatus 1 comprises an ultrasonic wave generating section 1a for generating ultrasonic waves and a horn 1b for transmitting ultrasonic waves generated at the ultrasonic wave generating section 1a to the substrate 2. For the ultrasonic wave generating section 1a, any product that can generate ultrasonic waves of specific frequencies and vibration amplitudes can be used without any limitation. For example, Branson Welder 900 Series (made by Branson Ultra-Sonic Division of Emerson Japan, Ltd.) may be used.

For the frequency of ultrasonic waves generated by the ultrasonic wave generating section 1a, any frequency from 20 KHz. upward may be used. But ultrasonic waves of high frequency are preferable. The use of a high frequency ultrasonic wave can increase frictions between the substrate 2 and the stamper 3 as described below and raise higher in a shorter length of time the temperature at the contact surface of the substrate 2 with the stamper 3. And by raising higher the temperature of the contact surface of the substrate 2 with the stamper 3, it is possible to make it certain that information signals of the stamper 3 will be transcribed to the substrate 2. And the conditions of this ultrasonic wave including frequency, vibration amplitude, etc. may be set as the occasion may require depending on the conditions of the substrate 2 including material and applied period of time of the ultrasonic wave. For example, in the case of the above-mentioned Branson Welder 900 Series, the frequency of ultrasonic wave generated is 20 KHz., and the actual vibration amplitude of the horn is approximately 10 $\mu$m at the maximum. And this vibration amplitude can be easily adjusted with a controller (not shown) installed outside.

It is preferable to make ultrasonic waves generated at the ultrasonic wave generating section 1a vibrate vertically against the main surfaces of the substrate 2 and the stamper 3. This is because, by having the ultrasonic waves generated at the ultrasonic wave generating section 1a or the ultrasonic wave to be applied to the substrate 2 and the stamper 3 vibrate vertically against the main surfaces of the substrate 2 and the stamper 3, information signals can be transcribed well without causing any damages on the surface of the substrate.

Figure 2:
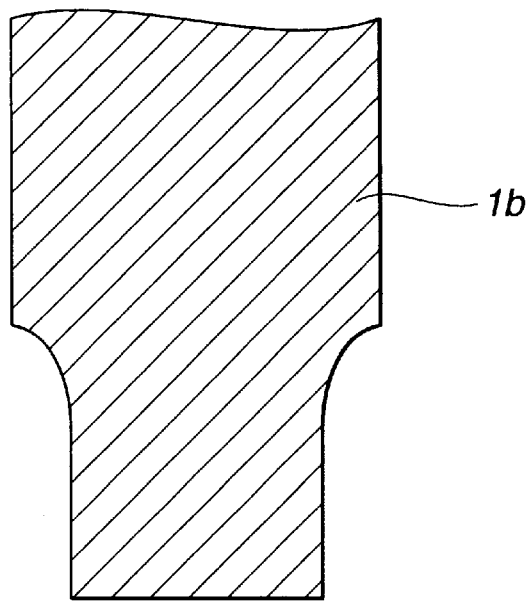
FIG. 2 is a cross-sectional view showing an example of the tip of the horn.
Figure 3:
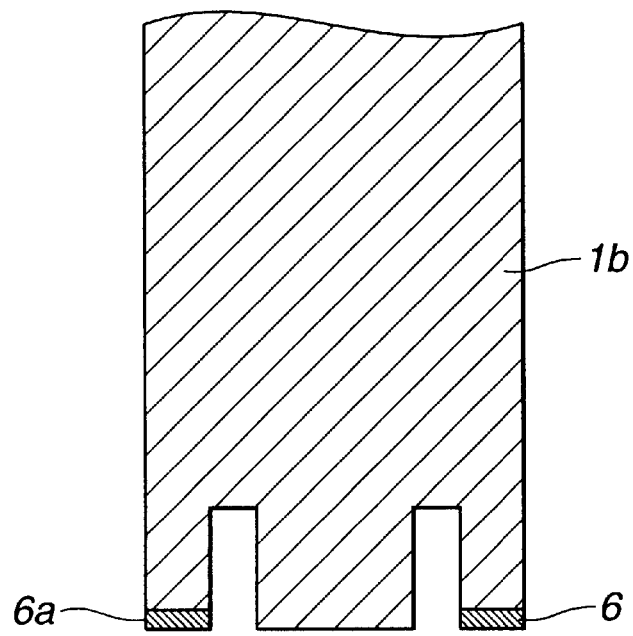
FIG. 3 is a cross-sectional view showing another example of the tip of the horn.

The horn 1b plays the roles of converting the ultrasonic waves generated at the ultrasonic generating section 1a to a specified vibration amplitude, transmitting the same to the substrate 2 and applying pressure on the substrate. It is designed to be mobile upward and downward. When information signals are to be transcribed, the main surface of the tip of the horn 1b is in contact with the main surface of the substrate 2 facing each other. And the horn 1b, while the main surface at its tip remains in contact with the main surface of the substrate 2, further pressurizes the substrate 2 up to a prescribed pressure and transmits ultrasonic waves generated at the ultrasonic wave generating section to the substrate 2. The horn 1b is made of a material such as duralimin for example. The form of the tip of the horn 1b may be a form as shown in FIG. 2. It may also be a form as shown in FIG. 3. The horn 1b shown in FIG. 3 is provided with an annular member 6 made of a material having a high friction coefficient such as cork on the on the periphery of the top surface of the horn 1b. And the contact surface of the annular member 6 with the horn 1b and the main surface 6a on the other side are disposed in such a way that they are on the same plane as the main surface at the tip of the horn 1b. This assures that the annular member 6 is fixed on the substrate 2 so that the horn 1b and the substrate 2 may not shift from their relative position, when ultrasonic waves are applied on the substrate 2 and the stamper 3. And the speed of vertical movement and pressure coming from the horn 1b can be controlled by said controller (not shown). And the shape and dimension of the horn 1b are set according to the frequency of the ultrasonic wave used, the material and dimension of the stamper 1b and the substrate 2 and other conditions.

For the substrate 2, substrates made by injection molding, cast plates or extrusion sheets, etc. can be used. And as for the plate thickness, there is no particular restriction. And sheets consist of even extrusion sheets free of die lines, cast sheets or polymer alloys having a superior transferability of information signals. These sheets may be made by injection molding. The term "cast sheet" used here means a sheet made by injecting a resin monomer on a sheet of glass or a metal plate or between plates and polymerizing the same, or by melting a polymer and transforming it into a sheet and then by blowing away solvent therefrom. And the expression "die line" means convex and concave stripes on a sheet or a film resulting from damages by a die or resin scum having stuck around the same when sheets or films are produced by an extruder.

And the materials of the substrate 2 are not limited to plastics, and glass or other materials having a softening point lower than the softening point of the horn or the stamper.

The stamper 3 is made of a material such as nickel, for example. And on the main surface of the side in contact with the substrate 2, micro convexconcaves corresponding to pits and grooves serving as the basis of information signals of the recording medium. And the transcription of micro convexconcaves formed on the stamper 3 onto the substrate 2 allows the micro convexconcaves transcribed on the substrate 2 to function as pits or grooves.

The die 4 is made of materials such as for example SUS402 and is fixed on the stage 5. This die 4 is fixed by the vacuum attraction of the stamper with a diameter of for example about 100 mm. The fixation of the stamper 3 by means of vacuum attraction creates friction between the stamper 3 and the die 4 during the process of transcription, which in turn prevents the energy of ultrasonic waves from being consumed by the friction between the stamper 3 and the die 4. This in turn enables the energy of ultrasonic waves to be consumed efficiently for the friction between the substrate 2 and the stamper 3. Or the die 4 may be of a such construction that convexconcaves for fixing the stamper to the die 4 are formed directly by means of etching.

The stage 5 serves to fix the die 4, and is integrated with the ultrasonic wave generating section 1a in the background not shown. The integration of the stage 5 and the ultrasonic wave generating section 1a enables to prevent the stage 5 and the ultrasonic wave generating section 1a from shifting from their mutual positions. As this ensures that the energy of ultrasonic waves is applied to the specified position and the specified direction of the substrate 2 and the stamper 3, the dispersion of the energy of ultrasonic waves is avoided and precise transcription of information signals can be assured.

And now, the method of transcribing the information signals of the stamper 3 to the substrate 2 with this apparatus will be explained.

To begin with, the stamper 3 with specified information signals formed on a main surface is placed on the die 4 in such a way that the main surface would face upward. And the stamper 3 is fixed firmly to the die so that no displacement may occur with respect to the substrate 2 and that no friction may develop between the die 4 and the stamper 3 when ultrasonic waves are applied to the stamper 3. For example, the stamper 3 is fixed to the die 4 by having the stamper 3 attracted by vacuum from below the stamper 3 by means of a vacuum apparatus disposed within the die 4.

Then, a substrate 2 formed according to a specified dimension is placed at a specified position on the stamper 3 so that the surface on which information signals will face the stamper 3.

Then, the horn 1b is lowered until the horn 1b comes into contact with the substrate 2, and pressure is applied until a specified pressure is reached. The pressure at this moment may be set as the occasion may require depending on the material of the substrate 2, the frequency of ultrasonic waves, applied period of time of ultrasonic waves, and other conditions.

At this moment, it is necessary to fix firmly the horn 1b and the substrate 2 so that no friction may develop at the contact surface between the horn 1b and the substrate 2 when ultrasonic waves are applied to the substrate and the stamper. And it is necessary to fix firmly the stamper 3 and the die 4 so that no friction may develop at the contact surface between the stamper 3 and the die 4 when ultrasonic waves are applied to the substrate and the stamper. When frictions have developed at the contact surface between the horn 1b and the substrate 2 and/or the contact surface between the stamper 3 and the die 4 as a result of application of ultrasonic waves to the substrate and the stamper, the energy of ultrasonic waves is consumed by the friction at the contact surface between the horn 1b and the substrate 2 and/or at the contact surface between the stamper 3 and the die 4. As a result, the amount of energy spent by frictions at the contact surface between the substrate 2 and the stamper 3 falls down when ultrasonic waves are applied to the substrate and the stamper, and the temperature at the contact surface between the substrate 2 and the stamper 3 cannot be raised to a specified temperature. As a means of fixing, in the case of fixing the horn 1b and the substrate 2 for example, it is possible to provide the horn 1b with a convex for fixing and to fit the convex of the horn 1b into a concave previously created on the substrate 2 to fix them. Alternatively, a protective sheet with strong friction may be inserted between the substrate 2 and the horn 1b to fix them.

Then, when the pressure is raised to a prescribed level (hereinafter referred to as the "trigger"), the ultrasonic wave generating section 1a is led to function to generate ultrasonic waves, which are then applied to the substrate 2 and the stamper 3 to cause the substrate 2 and the stamper 3 to vibrate. This vibration causes frictions on the contact surface between the substrate 2 and the stamper 3 creating friction heat. And this friction heat raises the surface temperature on the contact surface between the substrate 2 and the stamper 3. And when the surface temperature on the contact surface between the substrate 2 and the stamper 3 has risen to the glass transition temperature of the substrate material or above, the surface layer of the contact surface between the substrate 2 and the stamper 3 softens, and by the pressure applied by the horn 1b, micro convexconcaves formed on the stamper 3 representing information signals are transcribed on the substrate 2. When polycarbonate sheets for example are used for the substrate 2, the surface temperature of the contact surface between the substrate 2 and the stamper 3 is raised to the glass transition temperature of polycarbonate of 143° C. or above. This causes the surface layer of the contact surface between the substrate 2 and the stamper 3 to soften, and the pressure applied by the horn 1b causes the micro convexconcaves representing information signals to be transcribed on the substrate. The section of the substrate 2 where temperature has risen at this time is limited to the contact surface layer with the stamper 3. And when the transcription of information signals is completed, in other words when the application of ultrasonic waves has ended, the surface layer of the contact surface between the substrate 2 and the stamper 3 is instantly cooled naturally and its temperature has fallen down to the room temperature. Therefore, at the end of the transcription, the substrate 2 can be removed immediately. In other words, the cooling process for cooling down the substrate temperature required in the case of the prior transcribing method in which substrates are heated to a high temperature is eliminated, enabling to improve the production efficiency in the manufacturing process. And because the section of the substrate 2 where temperature has risen is limited to the contact surface layer with the stamper 3, there is neither deformation nor changes in thickness of the substrate 2 resulting from heat after the transcription. Thus, information signals can be transcribed with a high precision and high-quality substrates can be manufactured.

And even when a material with a high glass transition temperature is used as the substrate material, it is possible to raise instantly the temperature of the contact surface layer of the substrate with the stamper 3 and soften the contact surface layer, and thus to transcribe easily information signals.

The frequency, vibration amplitude and applied period of time of ultrasonic waves may be set as the occasion may require depending on the material of the substrate 2, the shape of the horn 1b and other conditions. And the vibration amplitude of the ultrasonic waves to be applied can be set in such a way as to allow changes in the pressure set.

The micro convexconcaves corresponding to information signals formed on the stamper 3 by the process mentioned above can be transcribed on the substrate 2.

In the above description, the stamper 3 is disposed on the die 4 side and the substrate 2 on the horn 1b side. However, it is also possible to adopt a construction in which the stamper 3 is disposed on the horn 1b side and the substrate 2 on the die 4 side. In this case, it is necessary to fix firmly the horn 1b and the stamper 3 so that no friction may occur on the contact surface between the horn 1b and the stamper 3 when ultrasonic waves are applied to the substrate and the stamper. Incidentally, it is possible to directly etch the horn 1b so that it may serve concurrently as a stamper. And it is necessary to fix firmly the substrate 2 and the die 4 so that no friction may occur on the contact surface between the substrate 2 and the die 4 when ultrasonic waves are applied to the substrate and the stamper. When friction develops on the contact surface between horn 1b and the stamper 3 and/or on the contact surface between the substrate 2 and the die 4, the energy of ultrasonic waves is consumed by the friction on the contact surface between the horn 1b and the stamper 3 and/or on the contact surface between the substrate 2 and the die 4. As a result, the amount of energy spent by frictions at the contact surface between the substrate 2 and the stamper 3 is reduced when ultrasonic waves are applied to the substrate and the stamper, and the temperature at the contact surface between the substrate 2 and the stamper 3 cannot be raised to a specified temperature. As a means of fixing, in the case of fixing the horn 1b and the stamper 3 for example, it is possible to provide the horn 1b with a convex for fixing and to fit the convex of the horn 1b into a concave previously created on the stamper 3 to fix them. Alternatively, a protective sheet with strong friction may be inserted between the substrate 2 and the horn 1b to fix them.

In the preceding paragraph, the case of transcribing information signals only on one main surface of the substrate is described. But information signals may be transcribed on both main surfaces of the substrate, and in this case the whole construction may consist of a substrate sandwiched by two stampers. In this case also as in the case described above, it is necessary to fix firmly the stamper with the horn and the die.

Transferability of information signals varies depending on the shape of the stamper, for example the depth and width of grooves for information signals or the dimension of pits. Therefore, in order to uniformize and ensure transferability, it is possible to preheat in advance the substrate object of transcription to a temperature higher than ordinary to improve transferability. Preheating in this case is accessory. It is not necessary to preheat the substrate to a high temperature as in the traditional methods of injection molding and high temperature transcription. It is enough to heat to such an extent that does not cause any deformation of the substrate. And in consideration of cooling of the substrate after each transcription, it is preferable that the preheating temperature should be set as low as possible. A low setting of the preheating temperature can shorten the time required for the cooling process of the substrate after each transcription, and thus to improve productivity. As methods to preheat the substrate, infrared rays and hot air may be used.

And it is possible to preheat the stamper to improve the transferability of information signals. In this case, the stamper may be preheated, or the die may be heated so that the stamper may be preheated through the conduction heat coming from the die, or both the stamper and the die may be preheated. In this case also, the preheating of the die and/or the stamper is accessory. It is not necessary to preheat the substrate to a high temperature as in the traditional methods of injection molding and high temperature transcription. It is enough to heat to such an extent that does not cause any deformation of the substrate. And in consideration of cooling of the substrate after each transcription, it is preferable that the preheating temperature should be set as low as possible. A low setting of the preheating temperature can shorten the time required for the cooling process of the substrate after each transcription, and thus improves production efficiency. As methods to preheat the stamper, for example a temperature regulator of hot water used in injection molding may be used to circulate hot water inside the die and/or stamper to raise the temperature of the die and/or stamper to a prescribed level and thus preheat the stamper.

And when polycarbonate and other resins having a high water absorbency are used as the substrate material, according to the traditional methods of injection molding or high-temperature transcription, water content present within the substrate is heated suddenly, evaporates and generates bubbles and thus leads often to a lower quality of the substrate. In this transcribing method, however, only the temperature of the contact surface of the substrate with the stamper rises, and therefore no such bubbles are generated, and the quality of the substrate is not adversely affected.

In the transcribing method described above, only the temperature of the contact surface of the substrate with the stamper is raised to the glass transition temperature of the substrate or above, and therefore the whole substrate is not heated. Accordingly, the substrate does not warp nor deform due to heat after the transcription of information signals. Therefore, this transcribing method enables to transcribe with a high precision and to produce high-quality substrates.

As this transcribing method raises only the temperature of the contact surface of the substrate with the stamper, at the end of the transcription of information signals, the temperature of the contact surface of the substrate with the stamper falls to the room temperature. Therefore, the cooling process of the substrate after the transcription of information signals becomes useless, enabling to improve production efficiency in the manufacturing process.

EMBODIMENTS

The present invention will be explained below based on specific embodiments.

Embodiment 1

Figure 4:
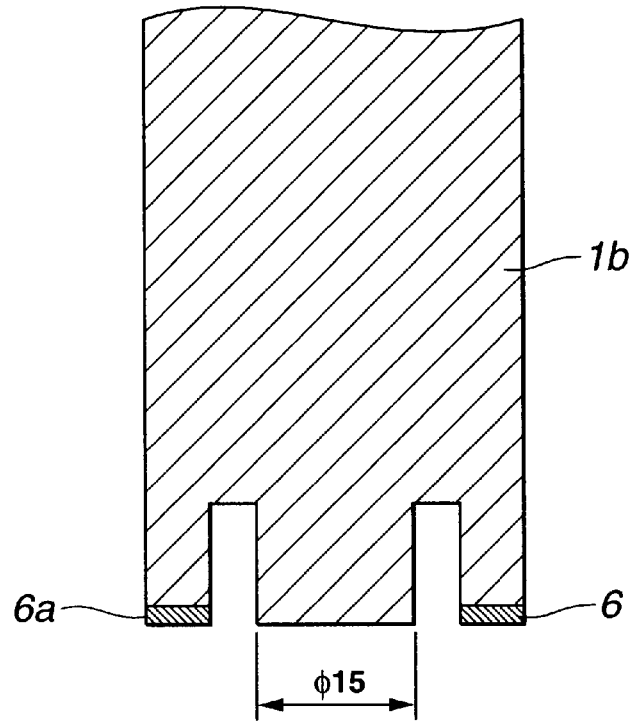
FIG. 4 is a cross-sectional view showing the tip of the horn used in the embodiment 1.

An information signal transcribing apparatus as shown in FIG. 1 was made according to the mode of carrying out as described above and information signals formed on the stamper and represented by convexconcaves were transcribed on the substrate. The configuration of the information signal transcribing apparatus is shown below. And for the horn, a product of the shape and dimensions shown in FIG. 4 was used. And as for the annular member, cork was used. Ultrasonic wave generating apparatus:

| | |
|---|---|
| (Ultrasonic wave generating section): | Branson Ultrasonic Wave Plastic Welder -900 Series Frequency of the generated ultrasonic wave: 20 Khz |
| (Horn) | (Material) Duralumin φ15 mm (tip) |
| Maximum vibration amplitude: | 25 μm |
| Stamper: | (Material) Nickel φ96 mm |
| Track pitch: | 1.4 μm |
| Information signal (groove and pit): | 90 mm deep |
| Substrate: | (Material) Polycarbonate |
| (Dimensions) W × T × H = | 50 mm × 50 mm × 0.5 mm |

The stamper is fixed to the die by means of a vacuum attracting apparatus. And a polyethylene protective sheet is pasted on the contact surface with the substrate to prevent any friction between the horn and the substrate.

An information signal transcribing apparatus with the configuration described above was used to transcribe information signals formed as micro convexconcaves on the stamper onto the substrate according to the following transcribing conditions:

| Transcribing conditions | |
|---|---|
| Pressurization: | 500 KP |
| Trigger: | 200 N |

Vibration amplitude of ultrasonic vibrations: (1) 12.05 μm, (2) 24.1 μm

Applied period of time of ultrasonic waves: (1) 0.3 sec., (2) 0.7 sec.

As for the application of ultrasonic waves to the substrate and the stamper, (1) ultrasonic waves of a low vibration amplitude of 12.05 μm are applied for 0.3 seconds, and then (2) ultrasonic waves of a high vibration amplitude of 24.1 μm are applied for 0.7 seconds for a total length of time of applying ultrasonic waves of 1 second.

Embodiment 2

Figure 5:
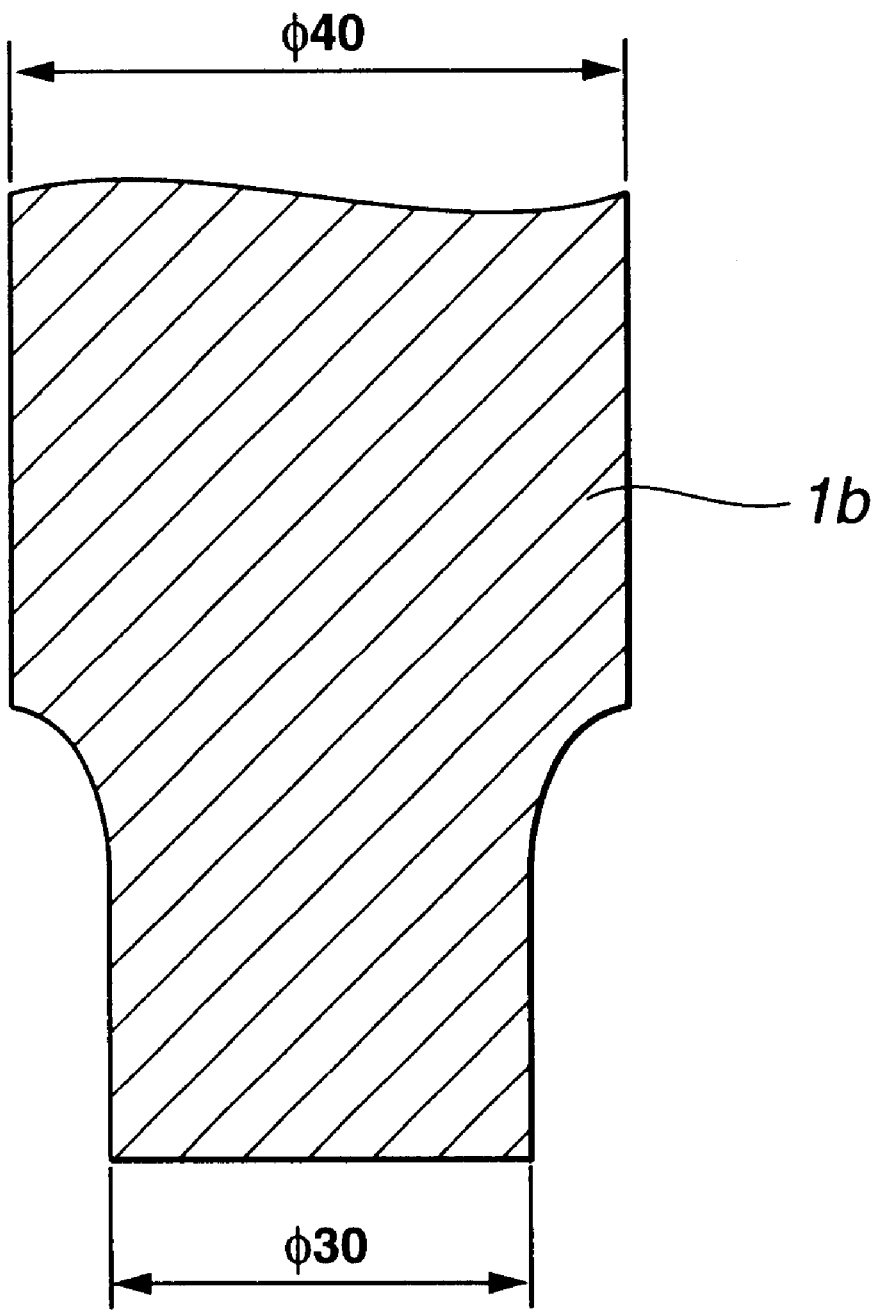
FIG. 5 is a cross-sectional view showing the tip of the horn used in the embodiment 2.

An information signal transcribing apparatus as shown in FIG. 1 was made according to the mode of carrying out mentioned above, and information signals formed on the stamper and represented by convexconcaves were transcribed on the substrate. The configuration of the information signal transcribing apparatus is shown below. And a horn of the shape and dimensions shown in FIG. 5 was used. Ultrasonic wave generating apparatus:

| | |
|---|---|
| (Ultrasonic wave generating section): | Branson Ultrasonic Wave Plastic Welder-900 Series Frequency of the generated ultrasonic wave: 40 KHz |
| (Horn) | (Material) Duralumin φ30 mm (tip) Maximum vibration amplitude: |
| Stamper: | (Material) Nickel φ96 mm |
| Track pitch: | 1.4 μm |
| Information signal (groove and pit): | 90 nm deep |
| Substrate: | (Material) Polycarbonate |
| (Dimensions) W × T × H = | 50 mm W × 50 nm T × 0.5 mm H |

The stamper is fixed to the die by means of a vacuum attracting apparatus. And a polyethylene protective sheet is pasted on the contact surface with the substrate to prevent any friction between the horn and the substrate.

An information signal transcribing apparatus with the configuration described above was used to transcribe information signals formed as micro convexconcaves on the stamper onto the substrate according to the following transcribing conditions:

| Transcribing conditions | |
|---|---|
| Pressurization: | 500 KP |
| Trigger: | 200 N |

Vibration amplitude of ultrasonic vibrations: (1) 7.8 μm, (2) 27.3 μm

Applied period of time of ultrasonic waves: (1) 0.3 sec., (2) 1.7 sec.

As for the application of ultrasonic waves to the substrate and the stamper, (1) ultrasonic waves of a low vibration amplitude of 12.05 μm are applied for 0.3 seconds, and then (2) ultrasonic waves of a high vibration amplitude of 24.1 μm are applied for 1.7 seconds for a total length of time of applying ultrasonic waves of 2 seconds.

Then, we evaluated the substrate on which information signals were transcribed as described above paying particular attention on the state of transcription of information signals and on whether the substrate was warped or not.

Evaluation of the Transcription Condition

For the evaluation of the transcription condition, we used a nanopicx desk-top Scanning Probe Microscope System (AFM) (made by Seiko Instrument, Inc.) to measure the depth of information signals on the substrate according to the following conditions:

| | |
|---|---|
| Measuring mode: | Tapping mode |
| Scope of measurement: | 4 μm × 4 μm |
| Scanning speed: | 130 sec./frame |

Evaluation of the Substrate Warps

We evaluated the substrate warps after transcription by measuring the same with a flatness tester FM 200 DISK (made by TROPEL) according to the following conditions:

| Measuring conditions (resolving power): | 10.16 μm/fringe |
|---|---|
| Scope of measurement: | 50 mm |

While information signals formed on the stamper of the embodiment 1 were found to be 90 nm deep, information signals formed on the substrate were 89 nm deep. And our measurements of the temperature of the contact surface layer of the polycarbonate substrate and the stamper and that of the main surface on the opposite side during the transcription of information signals showed no temperature rise from the room temperature. And after the transcription of information signals, we removed immediately the polycarbonate substrate from the information signal transcribing apparatus and measured the temperature of the main surface on which information signals were transcribed. We found however no temperature rise. And we found no warps nor deformation of the substrate on the polycarbonate substrate following the transcription of information signals.

From these facts we confirmed that the application of ultrasonic waves with a frequency of 20 KHz to the substrate and the stamper caused a rise in temperature of only the contact surface layer of the polycarbonate substrate and the stamper. And from the fact that information signals were transcribed with such a high precision as reflected by an 89 nm depth of information signals on the substrate as compared with a 90 nm depth on the stamper, we confirmed that the temperature of the contact surface layer of the polycarbonate substrate and the stamper had risen to the glass transition temperature of the polycarbonate substrate or over.

While information signals formed on the stamper of the embodiment 2 were found to be 90 nm deep, information signals formed on the substrate were 89 nm deep. And our measurements of the temperature of the contact surface layer of the polycarbonate substrate and the stamper and that of the main surface on the opposite side during the transcription of information signals showed no temperature rise from the room temperature. And after the transcription of information signals, we removed immediately the polycarbonate substrate from the information signal transcribing apparatus and measured the temperature of the main surface on which information signals were transcribed. We found however no temperature rise. And we found no warps nor deformation of the substrate on the polycarbonate substrate following the transcription of information signals.

From these facts we confirmed that the application of ultrasonic waves with a frequency of 40 KHz to the substrate and the stamper caused a rise in temperature of only the contact surface layer of the polycarbonate substrate and the stamper. And from the fact that information signals were transcribed with such a high precision as reflected by an 89 nm depth of information signals on the substrate as compared with a 90 nm depth on the stamper, we confirmed that the temperature of the contact surface layer of the polycarbonate substrate and the stamper had risen to the glass transition temperature of the polycarbonate substrate or over.

From the above fact, we confirmed that the bringing the polycarbonate substrate and the stamper into contact and the application of ultrasonic waves to them while they remain under pressure raise the temperature of only the contact surface layer of the polycarbonate substrate and the stamper to the glass transition temperature of the polycarbonate substrate or over and enable to transcribe information signals with a high accuracy.

What is claimed is:

1. A transcribing method for transcribing micro convex-concaves of a stamper having information signals formed as the micro convexconcaves on a main surface onto a substrate, the method comprising;

a step of bringing a main surface of said substrate and the main surface of said stamper having micro convexconcaves formed thereon into contact facing each other;

a step of pressurizing said substrate and said stamper to a prescribed pressure while they remain in contact each other; and a step of raising the temperature of only the contact surface layer of said substrate which is brought into contact with said stamper to the glass transition temperature of the substrate or above.

2. The transcribing method according to claim 1 wherein said temperature raising step comprise a step of applying ultrasonic waves to said substrate and said stamper while they remain under pressure at a prescribed pressure and raises the temperature of only the contact surface layer of said substrate which is brought into contact with said stamper to the glass transition temperature of the substrate or above.

3. The transcribing method according to claim 2 wherein said ultrasonic waves cause said substrate and said stamper to vibrate vertically to their contact surfaces.

4. The transcribing method according to claim 2 wherein said pressurizing step comprises a step of bringing a horn for transferring ultrasonic waves generated by an ultrasonic wave generating means into contact with the other main surface of said substrate, and a step of applying pressure to the substrate by the horn brought into contact with the other main surface of said substrate; and wherein said ultrasonic waves applying step comprises a step of transferring ultrasonic waves to said substrate through said horn which applies the pressure to the substrate.

5. The transcribing method according to claim 4 wherein, in the pressure applying step, the pressure is applied to the substrate by the horn through a sheeting material designed to prevent the generation of the friction between said horn and said substrate.

* * * * *